United States Patent [19]

Beaujean

[11] Patent Number: 4,531,136
[45] Date of Patent: Jul. 23, 1985

[54] OPTICAL MEDIUM

[75] Inventor: Joseph M. E. Beaujean, Venlo, Netherlands

[73] Assignee: Docdata BV, Venlo, Netherlands

[21] Appl. No.: 500,339

[22] Filed: Jun. 2, 1983

[30] Foreign Application Priority Data

Jun. 2, 1982 [NL] Netherlands .................. 8202229

[51] Int. Cl.³ .............. G01D 15/34; B32B 15/08; G03C 5/04
[52] U.S. Cl. .................. 346/135.1; 428/913; 430/945
[58] Field of Search ........... 346/135.1; 428/913; 430/945

[56] References Cited

U.S. PATENT DOCUMENTS

| 4,245,229 | 1/1981 | Stephens | 346/135.1 |
| 4,370,391 | 1/1983 | Mori et al. | 428/697 X |
| 4,383,311 | 5/1983 | Ettenberg | 369/275 X |
| 4,387,381 | 6/1983 | Bell | 346/135.1 |
| 4,388,400 | 6/1983 | Tabei et al. | 430/346 X |
| 4,410,581 | 10/1983 | Nam | 428/195 X |

FOREIGN PATENT DOCUMENTS

| 56-34154 | 4/1981 | Japan | 369/275 |
| 2084786 | 4/1982 | United Kingdom | 369/275 |
| 2086638 | 5/1982 | United Kingdom | 369/275 |

Primary Examiner—E. A. Goldberg
Assistant Examiner—Gerald E. Preston
Attorney, Agent, or Firm—Handal & Morofsky

[57] ABSTRACT

A medium for recording optically readable information, comprising a transparent substrate layer, a semi reflective recording layer of a material which can melt, atomize or evaporate under the influence of light, and a separating layer is disclosed. Holes are put into the separating layer with a regular pattern with the holes extending through the complete thickness of the layer.

18 Claims, 2 Drawing Figures

OPTICAL MEDIUM

TECHNICAL FIELD

The invention relates to a medium for recording optically readable information, comprising a transparent substrate layer, a semi reflecting recording layer of a material which can melt, atomize or evaporize under the influence of light, and a separating layer.

BACKGROUND OF THE INVENTION

A recording medium of this type is shown in German "Offenlegungsschrift" No. 3.021.103. In this "Offenlegungsschrift" No. a recording medium is described in which an absorbing recording layer is positioned onto a transparent separating layer, which in turn is positioned on a reflecting layer. To protect the absorbing layer a transparent overcoat layer is positioned thereon, sometimes functioning as a substrate layer.

For recording information the absorbing layer is locally radiated by light through the overcoat layer, so that a part of the absorbing layer is strongly heated and as result thereof passes partly or completely into the liquid or gas phase. Thus holes are created in the absorbing layer. The information recorded in this way can be read out by illuminating the recording medium through the overcoat layer by a very narrow bundle of light having an intensity which is much smaller than the intensity of the bundle of light with which the information was recorded. At the positions where the absorbing layer is present, a lower amount of light will be reflected in comparison to positions where the absorbing layer is removed and where the underlying reflecting layer can reflect the incident light through the transparent layer.

U.S. Pat. No. 4,270,132 describes a similar medium for recording optically readable information. A partly reflecting recording layer is positioned onto a transparent separating layer underneath which a reflecting layer is positioned. Also in this medium the information is recorded by locally illuminating with a narrow bundle of light having a large intensity, so that a part of the partly reflecting recording layer melts or evaporates. When the information is read out also by means of a narrow bundle of light, but with a smaller intensity than the bundle used for recording, more light of the bundle is reflected by the unimpaired part of the surface of the partly reflecting layer than by areas in which a hole is created. The thickness of the transparent separating layer between the partly reflecting layer and the reflecting layer is determined such, that because of interference with the reflected light in the hole extinction of light will appear, so that practically no light will be received from an area in which the hole is created.

It is noted that the term light here covers not only visible light but also electromagnetic radiation having a wavelength outside the area of the visible light spectrum.

The disadvantage of the recording medium as described in the U.S. Pat. No. 4,270,132 is, that the partly reflecting layer onto which information is recorded, is not protected and therefore is liable to damage or can be polluted for instance by dust particles. The recording medium according to German "Offenlegungsschrift" No. 3.021.103 does not have this disadvantage, because the layer into which the information is recorded is covered by a transparent overcoat. The overcoat however is hampering the recording process because the melted or evaporated material of the recording layer enclosed between two transparent layers has a strongly reduced freedom of movement. The overcoat therefore reduces the photothermal sensitivity of the recording medium. Furthermore the recording medium described in both patents have the disadvantage that the transparent layer underneath the recording layer drains warmth out of the recording layer when information is recorded, with the result that a part of the heat generated by radiating the recording layer is not used for melting or evaporating the recording layer. Also because of this photothermal sensitivity is reduced.

Finally the recording media described in both mentioned patents have a disadvantage relating to the dimension of the holes in the recording layer. The dimension of these holes created by optical means in the recording layer is very undetermined. Practice has shown that small variations in the pulse duration of the recording light or in the thickness of the recording layer results in relatively large variations in the dimensions of the holes in the recording layer. Especially in the detection technique described in the above mentioned U.S. patent, in which interference of two light bundles is used, a proper control of the dimension of the recording holes is of significant importance.

The object of the invention is to provide a recording medium for optically readable information not having these disadvantages or at least in a very reduced way.

This object is reached by means of a recording medium of the above mentioned type which is in accordance with the invention, characterized by a separating layer with a regular pattern of holes extending through the whole thickness of the layer.

At the position of such a hole in the separating layer the recording layer above the hole can be melted or evaporated very easily, because the recording layer is insulated at the underside by means of air. Furthermore the melted or evaporated material can escape very easily through the hole in the separating layer. The creation of a hole in the recording layer having a diameter larger than the underlying hole in the separating layer will not be very easy, because in that case also material of the recording layer also has to be heated (as it is lying on top of material of the separating layer which material conducts the heat better than air). Therefore the dimensions of the holes in the recording layer will in general correspond to the dimensions of the underlying holes in the separating layer and will therefore be substantially independent of the duration of the recording pulse and of the thickness of the recording layer.

Finally to obtain the already mentioned interference effect during reading, the separating layer of the recording medium according to the invention should be thicker than that of the recording medium described in the above mentioned U.S. patent, because the light propagates in the holes in the first mentioned recording medium through air and in the last mentioned device through a transparent medium having an index of refraction which is significantly larger than the index of refraction of air. The relative accuracy of the thickness of the separating layer may therefore be larger in a recording medium according to the invention.

In the recording medium according to the invention the recording layer is positioned at the underside of the upperlying transparent substrate layer and is furthermore, however not over the whole surface, supported by the underlying separating layer. Into this separating layer the round holes are arranged into, for example a regular pattern. In the case of a recording medium in the form of a tape the holes in the recording layer can have the form of rectangular parallel slots. In case of a disk shaped recording medium these holes can have the form of a number of concentric circular slots or one spirally shaped slot.

In contrast to the recording medium described in the above mentioned patents, in the recording medium according to the invention less than the whole surface of the recording layer is available for recording information, and the information can only be recorded into those parts of the recording layer positioned above the holes of the separating layer. In general however said separating layer is not visible. In that case marks can be applied in or on the transparent layer of the recording layer, which marks indicate the position of the regular pattern of holes in the separating layer, and from which marks the position of the holes can be derived.

Because only a part of the total surface of the recording medium is available for recording purposes, namely only the parts above the holes and the separating layer, it is not necessary that the recording layer extends over the complete surface of the recording medium, and it is sufficient to have only a recording layer above the holes.

As is already remarked the recording layer is semi transparent. At the locations where the recording layer is removed above a hole therefore less light will be reflected when the information is read out then in locations with an unaltered recording medium surface, supposing there is no reflecting material inside said holes.

The contrast between the light reflected by holes not covered by the recording layer and by the unaltered recording layer surface can be increased by making the surface of the recording layer adjacent to the separating layer reflective or by inserting an additional reflective layer in between the recording layer and the separating layer. In that case during reading of an unimpaired part of the recording layer light is not only reflected by the surface of the recording layer, but also by the underlying reflecting separating layer or the additional reflecting intermediate layer, which last mentioned reflecting layers are reflecting light which is propagated through the recording layer.

It is indicated in U.S. Pat. No. 4,270,132 that an increased contrast can been obtained during reading if, at the locations where the recording layer is removed, light will be reflected by a reflective layer positioned at a lower level in such a way that said reflective light has a reverse phase in relation to the light reflected by the area around the holes resulting in light extinction.

This can be used in the medium according to the invention by positioning underneath the separating layer, at least at the location of the holes in the layer, a reflective layer, or by positioning the separating layer onto the polished surface of a metal plate. In a special embodiment the separating layer is made of the same material as the mentioned metal plate and forms one integral part therewith. By reflection at the bottom of the holes extinction of the light of the reading bundle will appear in the holes not covered by the recording layer. If the recording layer is unimpaired then a significant reflection will appear which, as is explained above, can be amplified by a reflecting separating layer or a reflecting intermediate layer between the recording layer and the separating layer.

It is advantageous to fabricate the separating layer out of a plastic material which can be hardened by radiation with ultra violet light.

The recording layer can be made out of material which melts under the influence of radiation. Suitable materials therefore are tellurium, an alloy of tellurium or bismuth. It is however not sufficient that a part of the recording layer melts, but the melted material must migrate in a sidewards direction with the result that after congelation of the melted material a hole is created in the recording layer. The same result can be obtained by using a material which in the molten state has a large surface tension, so that the molted part of the recording layer will contract into a ring around the molten spot. This fact appears for instance in a double layer of bismuth and selenium.

Besides materials which melt when heated also materials which are very fast to partly or completely evaporate or sublimate under heat are conceivable. In these materials recording is effected by evaporating or atomizing the recording material. Especially suitable therefore are PbS, $Ga_2Cl_6$, hydrids, nitrids, materials into which hydrogen is absorbed, zinc containing alloys and several amalgams such as tellurium amalgam. Preferably liquid or plastic amalgams are used. If such an amalgam is deposited on the surface of a reflector, then it will spread uniformly over the surface while not or hardly deteriorating the reflective capacity.

The bonding between the recording layer and the substrate layer can be improved by first of all depositing a very thin adhesive layer of for instance chromium, platinum or palladium or combinations of these metals for instance by means of atomizing before the recording layer is coated thereon. The bonding between the recording layer and the substrate layer is strongly enhanced thereby, especially if amalgams are used because mercury and mercury compounds have the capacity to wetten such a bonding layer.

It is indicated above that a reflective layer can be positioned between the recording layer and the separating layer and/or at the underside of the separating layer. Suitable materials therefore are aluminum, rhodium or titanium. However, it is also possible to replace the reflective layer at the underside of the separating layer by the polished surface of the metal plate fixedly connected to the recording medium, or by the reflective surface of a reflector not forming an integral part of the recording medium along which reflective surface the recording medium, in most cases in the form of a type, will be moved.

BRIEF DESCRIPTION OF DRAWINGS

The invention will now be explained in more detail with reference to the drawings in which.

DETAILED DESCRIPTION

Figure 1:
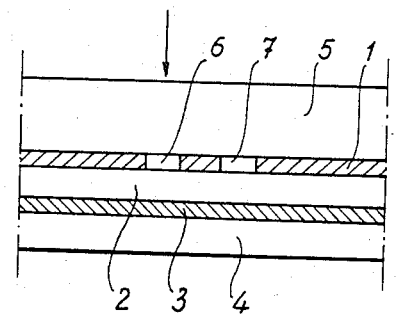
FIG. 1 illustrates a cross section through a prior art recording medium described in the German "Offenlegungsschrift" No. 3.021.103.

FIG. 1 illustrates a cross section through a recording medium described in the German "Offenlegungsschrift" No. 3.021.103. The reference number 1 indicates a thin recording layer of a somewhat reflective material, which can be evaporated under the influence of strong radiation, 2 is a separating layer of a transparent dielectric, 3 is a reflective layer and 4 is a substrate layer. The recording layer 1 is protected by a transparent overcoat layer 5 positioned thereon and in many cases functioning as supporting layer. By radiating with a high intensity narrow bundle, impinging through the layer 5 onto recording layer 1 holes 6 and 7 will be created in said last mentioned layer 1 as result of the local heating of said recording layer. The local heating as result of the impinging radiation can be increased because separating layer 2 with underlying reflective layer 3 functions as a resonator cavity.

If thereafter the recording medium is scanned by a light bundle of lower intensity then the light bundle used for recording the information, then a larger part of the incident light passing through layer 5 will be reflected in relation to a bundle of light impinging onto an unimpaired section of the surface of recording layer 1. However, when a narrow bundle is impinging onto an area of the recording layer having a hole 6, then a part of the impinging light will pass through hole 6 and through the separating layer 2, will be reflected by layer 3 and will leave through the hole 6. Light coming out of hole 6 however has a phase difference of $\pi$ with the phase of the light reflected at the surface of the recording layer 1. Therefore extinction appears.

Figure 2:
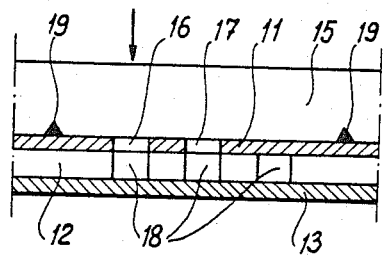
FIG. 2 illustrates a cross section through a recording medium according to the invention.

In the areas with holes 6, 7 therefore less light is reflected than by the unimpaired surface areas of recording layer 1. FIG. 2 illustrates a cross section through a recording medium according to the invention. The reference number 11 indicates a recording layer which by heating will change in an optically recognizable way. It is possible that by radiation part of layer 11 evaporates or melts, resulting in holes 16 and 17 in recording layer 11, however, it is also possible that for instance by heating the reflective capacity of the recording layer is locally altered. The reference number 12 indicates a separating layer into which openings 18 are created extending through the complete thickness of the separating layer. The reference number 15 is a transparent protective layer positioned onto the recording layer and funtioning furthermore as carrier. In practice the recording layer will be deposited onto layer 15. The reference number 13 indicates a reflective layer. Said layer may be part of the recording medium and may comprise a thin layer of a reflective material or may comprise a thick ground plate of metal with a polished surface. The reflective layer 13 does not have to be part of the recording medium, but can be a reflector along which the recording medium, for instance in the form of a tape, is moved.

The requirements for the material of separating layer 12 are minor; it is for instance not neccessary that this material is transparent. Only the parts of recording layer 11 above openings 18 can be used for recording information. By means of a narrow bundle of a relatively small intensity impinging through transparent layer 15 on to recording layer 11 a permanent alteration in recording layer 11, for instance a hole 16 or 17 or a spot with a different reflection coefficient, can be obtained. Thereby opening 18 with underlying reflective layer 13 may function as resonance cavity. It is pointed out thereby that recording layer 11 is partly reflective, but part of the impinging radiation will be passed and said transmitted radiation is amplified in cavity 18. It is not neccessary that recording layer 11 is completely covering the separating layer 12. It is sufficient that the recording layer is present above openings 18.

If the recording layer is completely or almost completely covering the separating layer 12, it is not visible where openings 18 are positioned and which part of recording layer 11 may be used for recording purposes. In that case the openings 18 are arranged into a regular pattern and marks 19 are applied onto recording layer 11 or onto transparent layer 15 indicating the position of the pattern of openings 18. From the location of the marks 19 the parts of the recording layer 11 which can be used for recording purposes, can be derived.

I claim:

1. A medium for recording optically readable information, comprising:
    a. an optically sensitive layer of material having first and second opposing faces;
    b. a transparent layer disposed adjacent and secured to said first face;
    c. a separating layer disposed adjacent and secured to said second face, said separating layer configured to define a plurality of holes which extend through the complete thickness of said separating layer; and
    d. a reflective member disposed in facing relationship to the surface of the separating layer opposite the recording layer.

2. A medium as in claim 1, wherein said optically sensitive layer is a semi-reflective recording layer and is made of a material which will melt, atomize or evaporate under the influence of light.

3. Medium for recording optically readable information according to claim 2, wherein the holes in said layer are round openings arranged according to a regular pattern.

4. Medium for recording optically readable information according to claim 2, wherein the holes in the recording layer have the form of slots, which are concentrically and circular or spiraly shaped.

5. Medium for recording optically readable information according to claim 2, wherein marks are applied in or onto the transparent substrate layer and/or the recording layer indicating the position of the holes in the separating layer.

6. Medium for recording optically readable information according to claim 2, wherein the recording layer is only present above the holes in the separating layer.

7. Medium for recording optically readable information according to claim 2 wherein the surface of the separating layer adjacent to the recording layer is reflective and adhered to said recording layer.

8. Medium for recording optically readable information according to claim 2, wherein the reflective layer is a polished metal plate.

9. Medium for recording optically readable information according to claim 8, wherein the separating layer is made an integral part with and from the same material as said plate.

10. Medium for recording optically readable information according to claim 1, wherein a reflective layer is disposed between the recording layer and the separating layer.

11. Medium for recording optically readable information according to claim 2, wherein the material of the separating layer is a plastic material which is hardened by radiation with ultraviolet light.

12. Medium for recording optically readable information according to claim 2, wherein the recording layer is made of a material which melts under the influence of light radiation.

13. Medium for recording optically readable information according to claim 12, wherein the recording layer is made of tellurium, an alloy of tellurium, bismuth, or a double layer of bismuth and selenium.

14. Medium for recording optically readable information according to claim 2, wherein the recording layer completely or partly evaporates or sublimates under light radiation.

15. Medium for recording optically readable information according to claim 14, wherein the recording layer is made of PbS, $Ga_2Cl_6$, a hybrid, a nitrid, a material to which hydrogen is absorbed, an alloy of zinc or an amalgam, such as tellurium amalgam.

16. Medium for recording optically readable information according to claim 15, wherein between the substrate layer and the recording layer a bonding layer is positioned comprising chromium, platinum or palladium or a combination of said metals.

17. Medium for recording optically readable information according to claim 2 wherein the reflective layer or layers are made of aluminum, rhodium, titanium or polished steel.

18. Medium for recording optically readable information according to claim 10 wherein the reflective layer or layers are made of aluminum, rhodium, titanium or polished steel.

* * * * *